United States Patent Office 3,594,263
Patented July 20, 1971

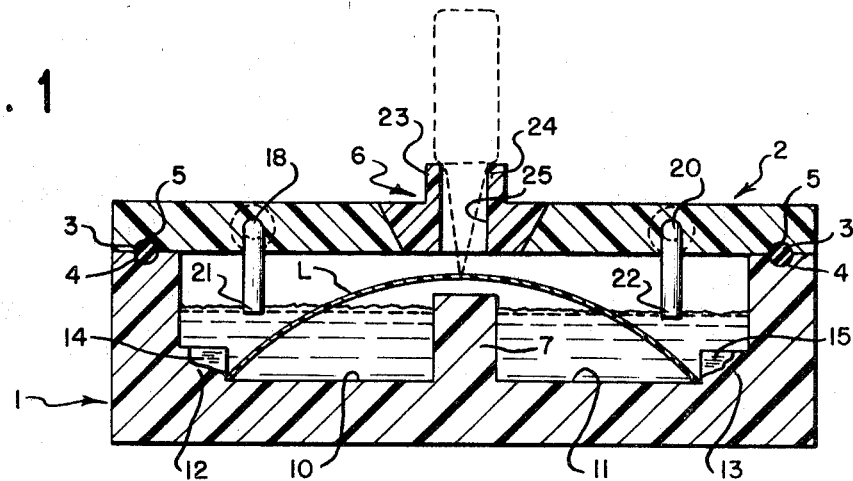

3,594,263
LAMINATED SHEET FOR ELECTROPHORESIS
James L. Dwyer, South Lincoln, Richard A. Paine, Bedford, and Charles W. Souza, Pinehurst, Mass., assignors to Millipore Corporation, Bedford, Mass.
Filed Mar. 27, 1967, Ser. No. 626,323
Int. Cl. B01d *13/02;* B32b *5/18*
U.S. Cl. 161—160  6 Claims

ABSTRACT OF THE DISCLOSURE

This invention provides a laminated sheet for electrophoresis consisting of a plastic base sheet to which is bonded a microporous plastic membrane sheet consisting largely of pores which is in bonded contact with the plastic base with the pores on the outer surface open for receiving electrolyte solution and the material to be analyzed by electrophoresis. It is important that the adhesive bonding material does not enter and plug the pores. The invention provides a process for forming the laminated sheet, which comprises adhesively connecting together the base sheet and the porous plastic sheet under such control of pressure and temperature that the porosity of the sheet is no impaired.

BACKGROUND OF THE INVENTION

Various types of porous sheets have been used for electrophoretic analyses such as paper and microporous plastic sheets of such thin and flexible nature that they require support. Such sheets are difficult to use and of uncertain stability for maintaining records. In contrast to the sheets used heretofore the laminated sheets of the invention are strong, durable, give much superior results and provide a broader utilization of light evaluating means.

SUMMARY OF INVENTION

The laminated sheet of the invention consists of a base sheet which is of clear stiff but flexible plastic and the porous plastic membrane sheet bonded thereto has such a multiplicity of micro-pores that it is opaque. The laminated sheet, after having been subjected to electrophoretic action, can be evaluated as with a light reflection device.

In another embodiment of the invention, the laminated sheet which was subjected to electrophoretic action is treated with a solvent for the porous membrane sheet to effect such a degree of solubility as to close the pores, consolidate the sheet and make it transparent whereby the specimen subjected to electrophoresis can be evaluated by light transmission scanning.

The laminated sheet of the invention may be used in various electrophoretic apparatus. For example, the drawings illustrate a device which may be used advantageously to employ the laminated sheet in electrophoretic analytical separation FIG. 1 is a vertical sectional view of the device;

FIG. 2 is a perspective of a portion of the receptacle of the device;

FIG. 3 is a plan view of the cover of the device;

FIG. 4 is an enlarged sectional view of a laminated sheet of the invention.

The device illustrated in the drawings comprises a receptacle 1 and a cover 2 which are in tight contact on the interposed plastic O-ring 3 located in mating grooves 4 and 5. The cover has a removable but tight fitting lid 6. The receptacle, cover and lid are made of a solvent resistant plastic, preferably clear such as a molded nylon.

The receptacle 1 has a central integral bridge 7 dividing the lower part into compartments 10 and 11. The compartments 10 and 11 have ridges 12 and 13 with recesses 14 and 15 respectively. As shown in FIG. 1 the bowed resilient laminated sheet L bears on the ridges and the recesses enable one to grasp the edges of the laminated sheet with spanning tongs to handle it without contamination. The compartments 10 and 11 contain the ionizing solution the upper level of which is below the top of the bridge but in contact with the ends of the laminated sheet. The cover has embedded electrical contact elements 18 and 20 the inner terminals of which 21 and 22 dip into the solution in the receptacles to effect the electrophoretic action.

The cap 6 may merely make a snug fit into the cover or it may be more securely attached as by means of half-threads. The lid has upwardly extending ears 23 and 24 between which is an opening 25 for the guidance therein of the specimen applicator shown in broken lines for depositing on the laminated sheet a very narrow strip of a closely regulated amount of the specimen to be analyzed.

DESCRIPTION OF PREFERRED EMBODIMENTS

The laminated sheet of the invention shown in FIG. 4 comprises a clear plastic sheet B, a microporous plastic membrane sheet M bonded together with a thermoplastic adhesive A. The section is greatly enlarged, the pores being disproportionally enlarged, for the purpose of illustration. The laminated sheet is preferably produced of the materials and by the technique as follows: The base sheet B is a plastic material having the requisite physical and chemical properties. It is preferably clear and is stiff and resilient so that it will hold the bowed position shown in FIG. 1 and may vary from about 6 to 12 mils, preferably 10 mils, thick. It must be a non-conductor of electricity under the conditions of use.

As for the chemical properties, the base sheet must be unaffected by such chemicals as dioxane, dioxane-isobutyl alcohol, glacial acetic acid-ethyl alcohol, cyclohexanone-ethyl alcohol, and glacial acetic acid. Also, the base sheet must be unaffected by the buffer solution used in the receptacle. Various plastic materials fulfill the above requirements such as a polyester (Mylar, the Du Pont 1000D) being especially effective, a polyamide, or polycarbonates.

The microporous plastic membrane sheet M may be formed of a mixture of cellulose nitrate and cellulose acetate or entirely of cellulose acetate according to the Zsigmondy U.S. Pat. 1,421,341 or the Cotton U.S. Pat. 2,944,017. The sheet is preferably formed of cellulose acetate because this sheet responds most effectively to the solvent action to close the pores and make the sheet clear. An effective sheet is about 5 mil thick and has average port sizes varying from 0.5 to 1.5 microns. This sheet transports the buffer solution by capillary action and enables the electrophoretic transport to take place. The bonding or adhesive material must also meet rather critical specifications.

The adhesive must be a thermoplastic material, preferably one that does not require a catlayst or a curing agent, has a sealing temperature below the heat distortion point of the porous plastic membrane sheet, be unaffected by the solvents or combinations listed under the base sheet requirements, or adversely affect the transparency of the base sheet. A Du Pont material known as a modified synthetic rubber adhesive (Du Pont 56016) has been found to be very effective.

The thickness of the finished dry coat of adhesive deposited on the base sheet must be within close limits. Optimum thickness range is 0.25 to 0.35 mil. If less than 0.25 mil is applied to the base sheet the amount is insufficient to bond to the porous membrane sheet. If more than 0.50 mil is applied, some of the adhesive when heated to seal the two sheets is absorbed into the pores and interferes with the electrophoretic separation process.

In forming the laminated sheet in a preferred operation, a base sheet of indefinite length is coated as with a doctor device to, say, 0.35 mil thickness and the coated surface is led into contact with a moving porous membrane sheet, also of indefinite length. The superposed sheet as a sandwich is fed over an endless metal belt and between the belt and a heated press roller which heats the laminated sheet to about 250° F. for about 1.5 minutes at a pressure of about 60 p.s.i.g. This operation effectively seals the two sheets together without plugging or impairing the pores.

In using the laminated sheet in electrophoretic analysis, for example, to separate the proteinaceous components of blood plasma, a piece of the laminated sheet is held at the ends in a bowed position with tongs and is placed into the receptacle 1 as shown in FIG. 1. The compartments 11 and 12 were previously filled with a buffer solution to the level shown which is below the top of the bridge 7. A typical buffer solution for this use consists of diethyl barbituric acid 2.76 grams, sodium diethyl barbiturate 15.4 grams, and distilled water 1 liter. The porous part M of the laminated sheet rapidly becomes wet with the buffer solution and electrically conducting. The specimens to be analyzed are placed on the porous surface M as by means of the serum applicator. An appropriate D.C. current is applied to the electrodes 18 and 20 and after the required action the laminated sheet is removed and evaluated as by a light scanning device.

If it is desired to convert the porous opaque sheet M to a clear state, it is treated with a carefully controlled amount of solvent for the porous sheet so that just enough solubility is effected to consolidate the pores and convert it to a clear state without impairing the specimen or the integrity of the laminated sheet. It is to be noted that the porous sheet has paper-like whiteness and is opaque due to diffraction caused by the multiplicity of pores, for the cellulose acetate itself, absent the pores, is clear. A base sheet formed entirely of cellulose acetate is most responsive to controlled solution. This solution may be effected with acetone and acetic acid or other known liquid solutions. It is preferred to carry out the consolidation of the pores by subjecting the laminated sheet to a vapor mixture of acetone and acetic acid just long enough for one to observe the disappearance of the white opaque appearance of the porous sheet M.

We claim:
1. The laminated sheet for electrophoresis which comprises a base sheet of plastic which is flexible but stiff enough to be self supporting, a separate microporous plastic membrane sheet in bonded connection with the base sheet and with at least the major portion of the pores covered by said base sheet, said base sheet and the porous plastic sheet being bonded together by a thermoplastic adhesive adhered to the solid portions of the porous plastic sheet leaving the pores open for receiving a buffer solution.

2. The laminated sheet as defined in claim 1 in which the base sheet is sufficiently resilient that it can maintain itself in a bowed position in a testing device.

3. The laminated sheet as defined in claim 1 in which base sheet and the porous plastic sheet are bonded together by a thermoplastic adhesive which engages the solid portions of the porous plastic sheet leaving a very substantial proportion of the pores open for receiving a buffer solution.

4. The laminated sheet for electrophoresis as defined in claim 1 in which the pores of the plastic membrane sheet have an average diameter of from 0.5 to 1.5 microns and are substantially open for receiving a conducting buffer solution and specimen to be tested.

5. A laminated sheet as defined in claim 1 in which the base sheet is a polyester about 10 mils thick and the adhesive is not over 0.50 mil thick.

6. The laminated sheet for electrophoresis as defined in claim 1 in which the pores of the porous plastic membrane sheet are consolidated and the sheet clear.

References Cited

UNITED STATES PATENTS

| | | | |
|---|---|---|---|
| 1,421,341 | 6/1922 | Zsigmondy et al. | 161—159UX |
| 2,957,791 | 10/1960 | Bechtold | 161—159UX |
| 2,960,462 | 11/1960 | Lee et al. | 161—159UX |
| 3,378,481 | 4/1968 | Saravis et al. | 204—299 |
| 3,405,206 | 10/1968 | Abell et al. | 156—247X |
| 3,407,111 | 10/1968 | Reilly | 161—160 |
| 3,413,842 | 12/1968 | Hecker | 210—198X |

WILLIAM A. POWELL, Primary Examiner

U.S. Cl. X.R.

156—60; 161—165; 204—180, 299